Jan. 26, 1954     D. A. PARKER     2,667,282
TRAILER DRAWBAR

Filed Nov. 24, 1950     4 Sheets-Sheet 1

INVENTOR
D. A. Parker
BY Kimmel & Crowell
ATTORNEYS

Jan. 26, 1954
D. A. PARKER
TRAILER DRAWBAR
2,667,282
Filed Nov. 24, 1950
4 Sheets-Sheet 2
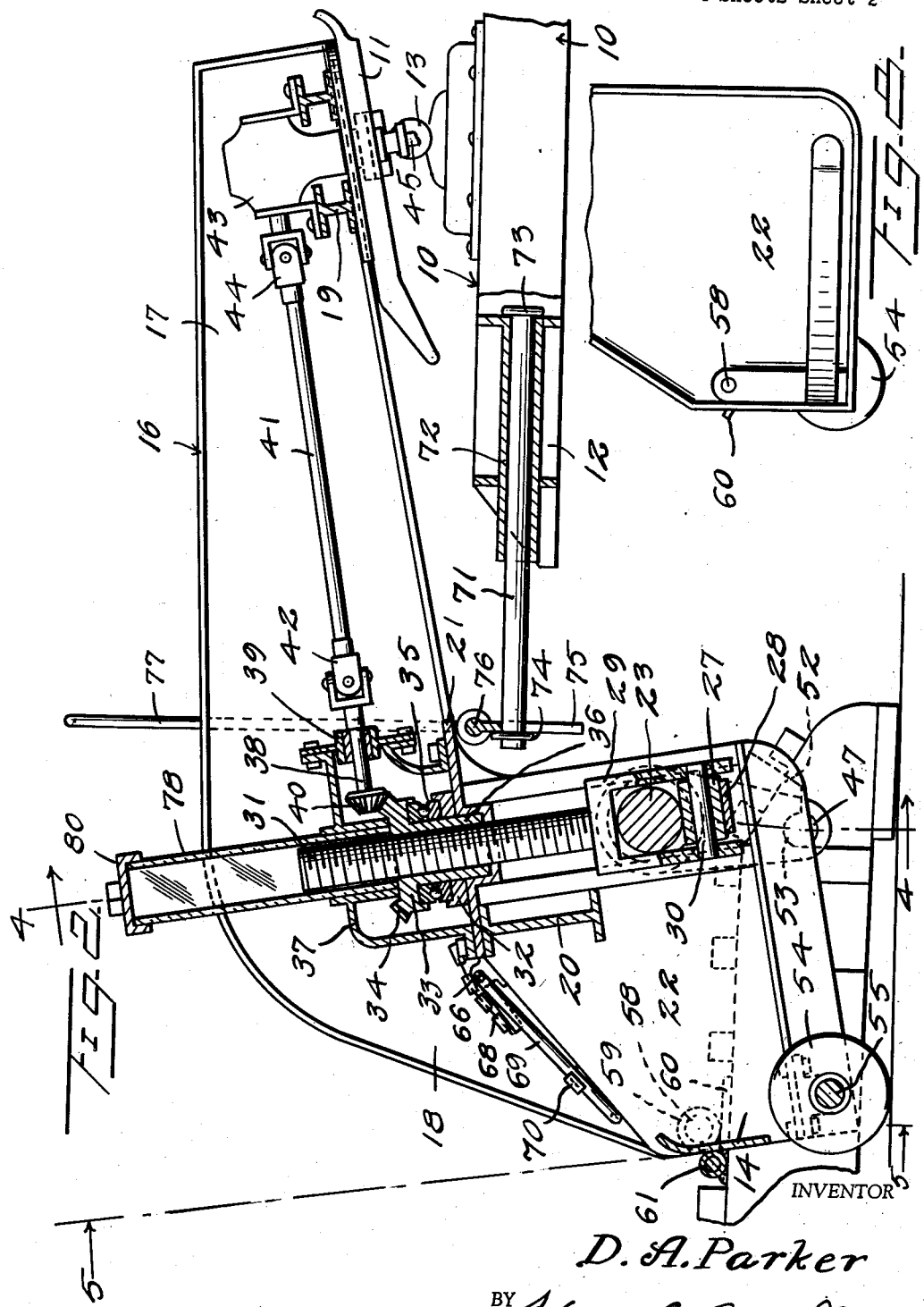
INVENTOR
D. A. Parker
BY Kimmel & Crowell
ATTORNEYS Jan. 26, 1954     D. A. PARKER     2,667,282
TRAILER DRAWBAR
Filed Nov. 24, 1950     4 Sheets-Sheet 3
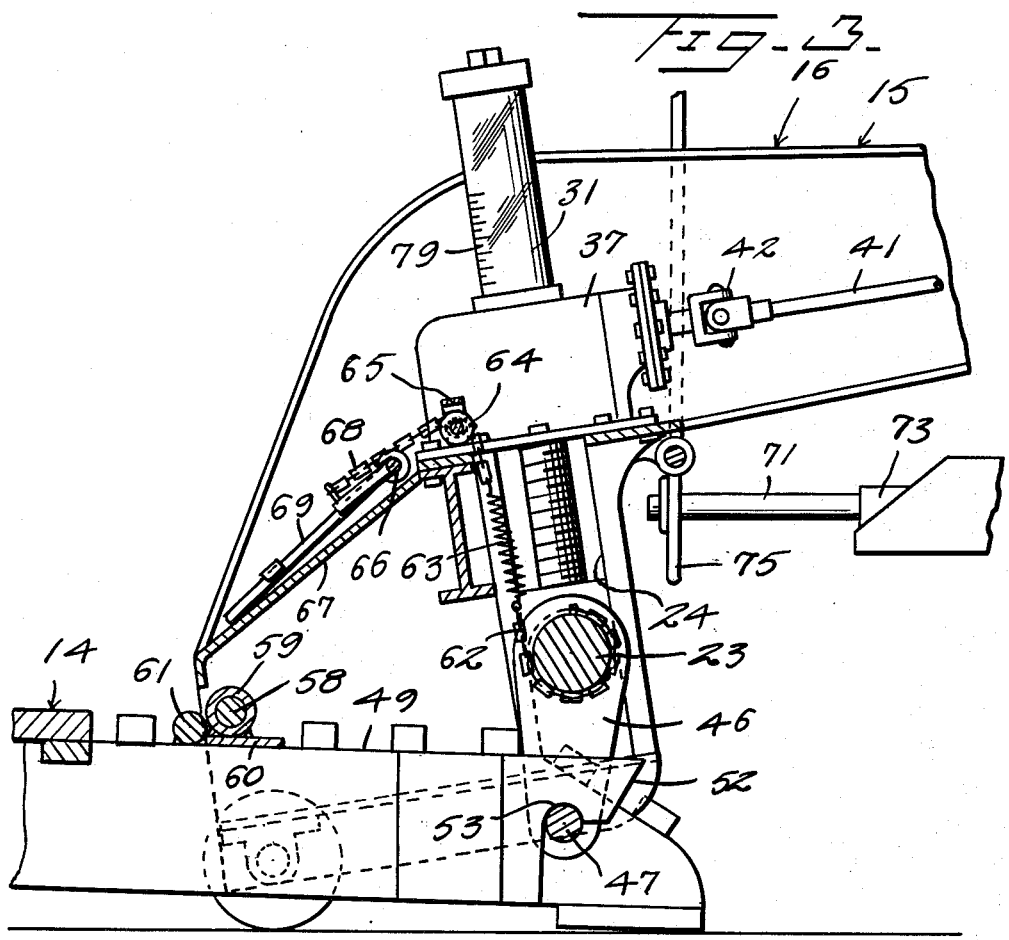
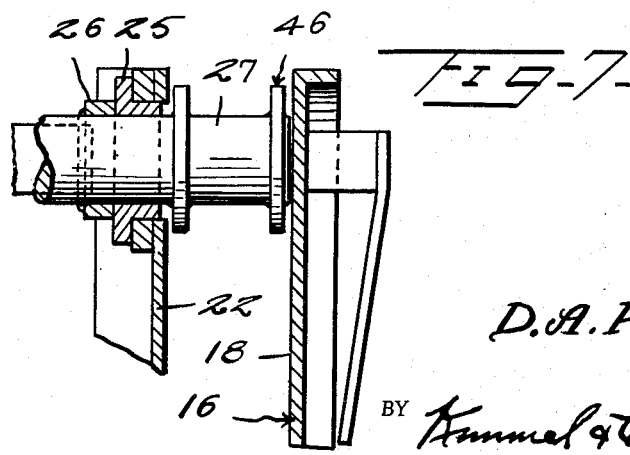
INVENTOR
D. A. Parker
BY Kimmel & Crowell
ATTORNEYS

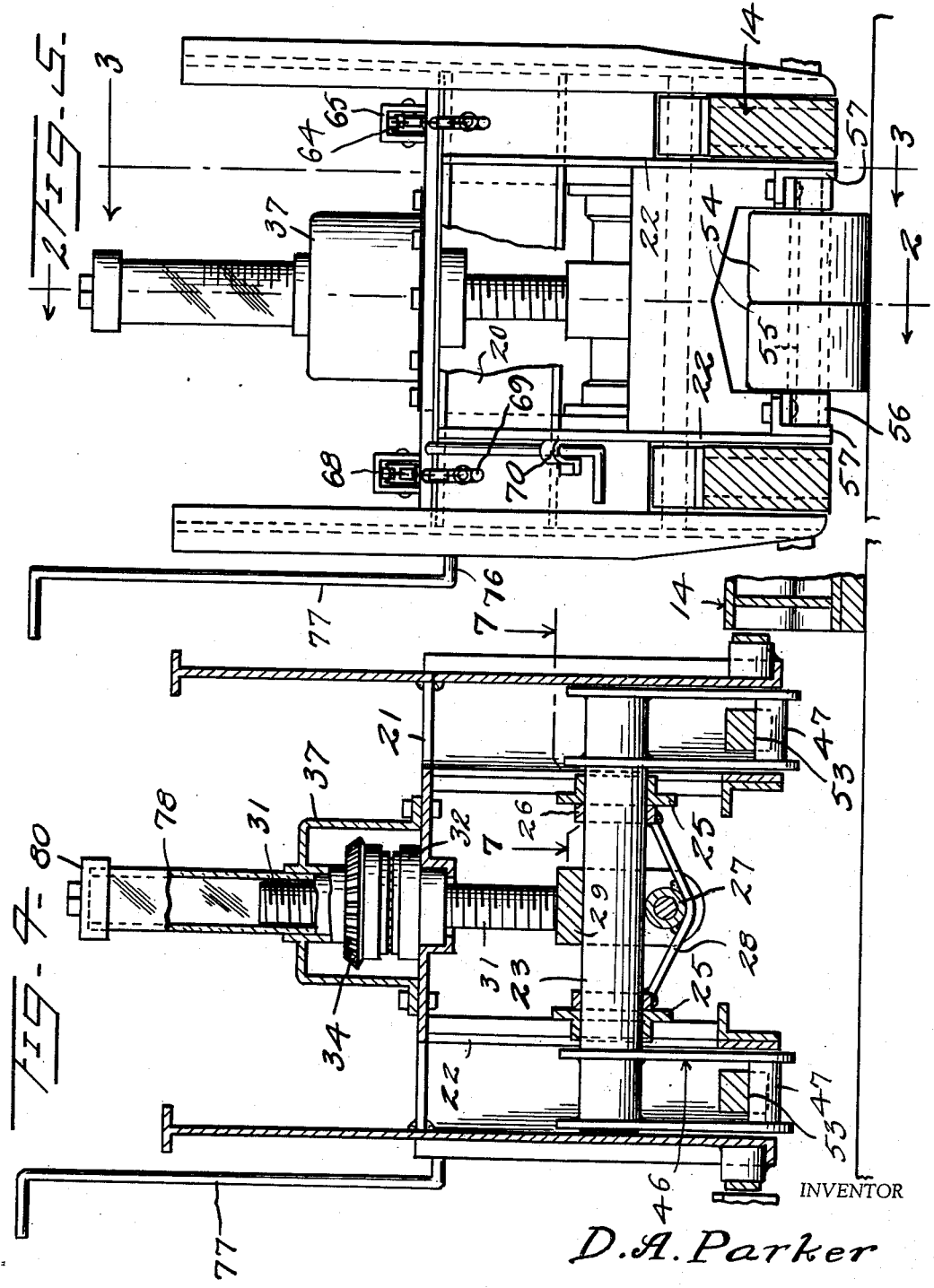

Patented Jan. 26, 1954

2,667,282

UNITED STATES PATENT OFFICE 2,667,282

TRAILER DRAWBAR

Dean A. Parker, Richmond, Mich.

Application November 24, 1950, Serial No. 197,393

6 Claims. (Cl. 214—506).

This invention relates to a gooseneck coupling between a tractor vehicle and a low slung trailer.

An object of this invention is to provide a gooseneck or inverted L-shaped drawbar which forms a coupling between a tractor vehicle and a low slung trailer and which is so constructed and arranged that the drawbar may be detached from or connected with the trailer.

Another object of this invention is to provide in combination a detachable drawbar and trailer which will permit lowering of the trailer to a loading or unloading position or raising of the forward end of the trailer to a moving position.

A further object of this invention is to provide a detachable drawbar which includes traction wheels for permitting shifting of the tractor with attached drawbar and with the latter uncoupled from the trailer.

A further object of this invention is to provide a drawbar structure which includes means operative from the tractor vehicle for effecting coupling or uncoupling of the drawbar from the trailer and for raising or lowering the front end of the trailer.

With the above and other objects in view, my invention consists in the arrangement, combination and details of construction disclosed in the drawings and specification, and then more particularly pointed out in the appended claims.

In the drawings:

Figure 2 is a longitudinal section taken on the line 2—2 of Figure 5.

Figure 3 is a vertical section taken substantially on the line 3—3 of Figure 5.

Figure 4 is a sectional view taken on the line 4—4 of Figure 2.

Figure 5 is a sectional view taken on the line 5—5 of Figure 2.

Figure 7 is a fragmentary sectional view taken on the line 7—7 of Figure 4.

Figure 8 is a fragmentary side elevation of the drawbar.

Figure 1:
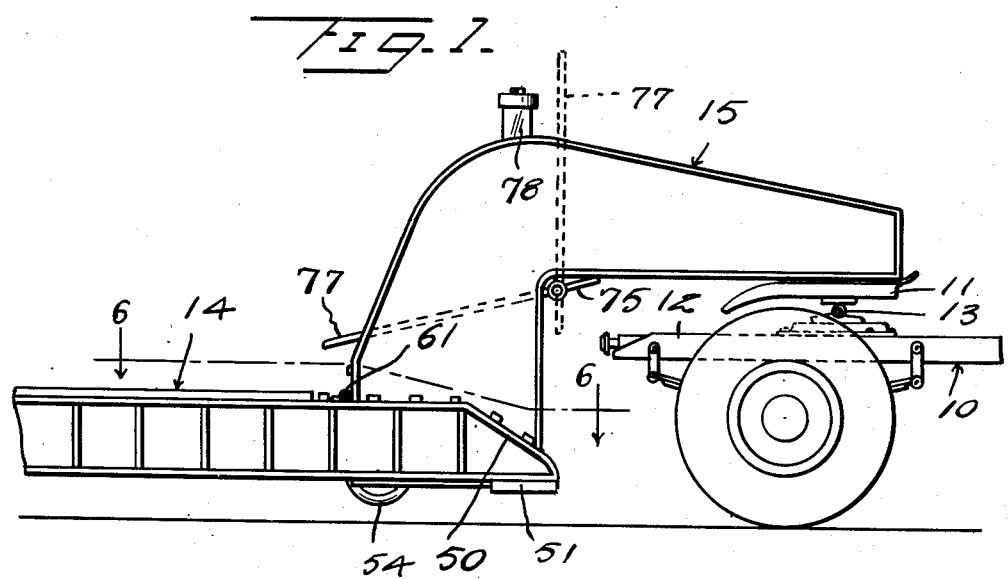
Figure 1 is a detail side elevation partly broken away of a drawbar and low slung trailer constructed according to an embodiment of this invention.

Referring to the drawings the numeral 10 designates generally a tractor vehicle of conventional construction which is provided with a fifth wheel 11 and includes a frame 12. In Figure 1 the rear portion of the tractor figure 10 is disclosed and a fifth wheel 11 is rockably mounted as at 13 on horizontally disposed pivot means. A low slung trailer member generally designated as 14 is disposed at the rear of the tractor vehicle 10 and is adapted to be connected with the tractor 10 by means of a detachable drawbar as will be hereinafter described.

A drawbar structure generally designated as 15 is pivotally connected with the fifth wheel 11 in a conventional manner, and the drawbar structure 15 includes a main frame structure formed of a pair of inverted L-shaped members 16. The L-shaped members 16 have a substantially horizontal upper side 17 and a depending rear side 18. There are two of these L-shaped members 16 which are connected together at their forward ends by means of connecting I beam members 19 and are connected together at their rear portions by means of a rear I beam 20.

A plate 21 is secured to the upper side of the I beam 20 and is fixed between the rear sides 18 of the frame members 16 and a pair of inner frame members 22 are secured to the plate 21 and to the beam 20. The inner frame members or plates 22 are spaced inwardly from the webs of the rear frame members 18, the purpose for which will be hereinafter described. A horizontally disposed vertically movable shaft 23 is disposed between the rear sides 18 and is vertically movable in vertically disposed slots or guides 24 which are formed in the inner frame members 22. The shaft 23 has a pair of flanged collars 25 rotatably disposed thereon which loosely engage in the guide slots 24, and the collars 25 are held against inward movement by means of a pair of collars 26 which are fixedly secured as by welding or the like to the shaft 23.

A sleeve or bearing member 27 is disposed transversely across the lower side of the shaft 23 midway between the ends thereof, and the bearing sleeve 27 is secured relative to the shaft 23 by means of a bowed bar 28 which is welded or otherwise fixedly secured to the collars 26.

An inverted U-shaped clevis 29 engages about the shaft 23 and a pin or pivot member 30 engages through the arms of the clevis 29 and through the bearing member or sleeve 27 so as to thereby connect the clevis 29 to the shaft 23. The clevis 29 has fixedly secured thereto an upwardly extending threaded jack shaft 31. The jack shaft 31 rotatably engages through a bearing 32 which is carried by the plate 21. A nut 33 is threaded on the shaft 31 and is formed with a bevel spur gear 34.

A thrust bearing 35 is disposed between the bearing 32 and the nut 33, and preferably the nut 33 includes a relatively long sleeve 36. A housing 37 is secured to the plate 21 and engages about the shaft 31 and gear 34. A stub shaft 38 is journalled in a bearing 39 carried by the housing 37 and has a bevel gear 40 secured thereto which meshes with the gear 34. A shaft 41 extends between the frame members 16 and is connected with the stub shaft 38 by means of a universal joint 42.

The shaft 41 is connected with a gear box 43 through a second universal joint 44, and gear box 43 is secured to the connecting eye members 19 and includes a shaft 45 extending downwardly through the fifth wheel 11 and adapted to be connected in a conventional manner with the power take-off of the tractor vehicle.

The shaft 23 has fixed thereto adjacent the opposite ends thereof a pair of clevises 46 which include a connecting pin 47.

Figure 6:
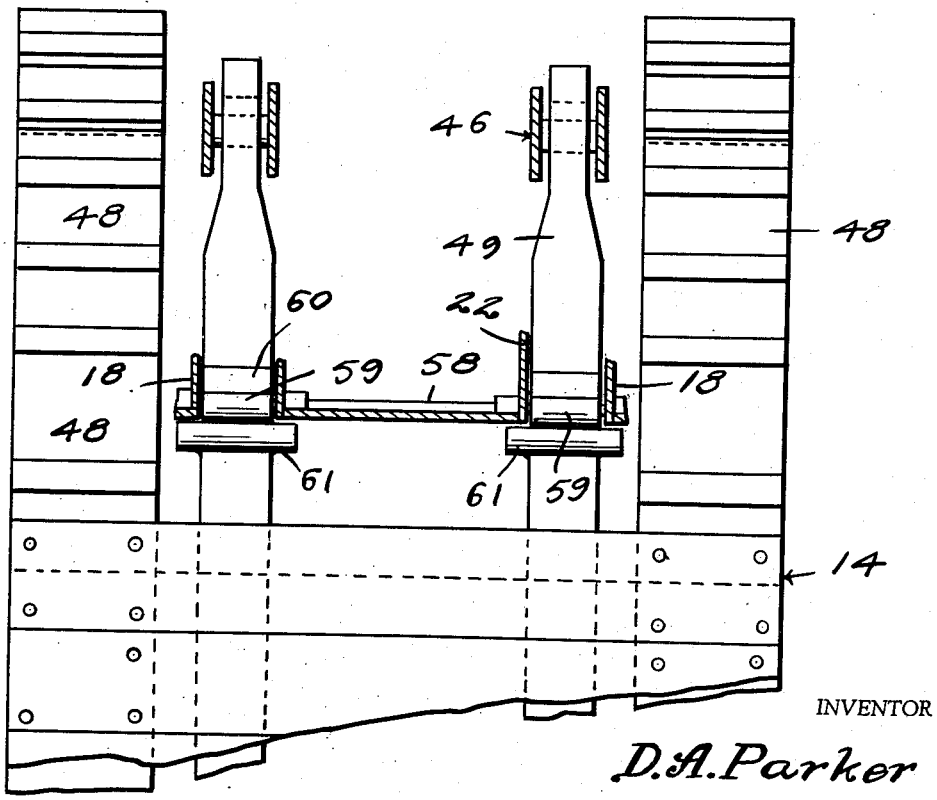
Figure 6 is a fragmentary sectional view taken on the line 6—6 of Figure 1.

Referring now to Figure 6 the trailer 14 includes a pair of parallel forwardly extending frame members 48 and a pair of forwardly projecting hooks or keepers 49 which are positioned between the frame extension members 48.

The frame extension members 48 are provided with downwardly inclined forward ends 50, and a shoe 51 is secured to the lower side of each frame extension member 48. The inclined forward portions 50 provide the track at the forward end of the trailer 14 so that when the forward end of the trailer is lowered with the shoes 51 engaging with the ground or road, the article which is to be loaded onto the trailer may be moved upwardly over the inclined track 50. Each keeper or hook 49 is formed with a downwardly and rearwardly inclined nose 52 and an arcuate keeper slot 53 within which a pin 47 is adapted to releasably engage. A drawbar 15 has secured to the lower rear portions of the inner frame members 22 a pair of wheels 54 which are rotatably mounted on a shaft 55 carried by bearings 56.

The bearings 56 are secured to angle members 57 which are fixed to the inner sides of the plates or inner frame members 22. The rollers or wheels 54 project downwardly a slight distance below the lower rear end of the drawbar 15 and are adapted to engage the ground or road when the drawbar 15 is uncoupled from the trailer or when the trailer 14 has been lowered to a loading or unloading position. A cross shaft 58 is secured between the side members 18 of the drawbar at the rear of the side members 18, and a pair of bearing sleeves 59 are loosely mounted on the shaft 58 on the outer sides of the inner frame members 22 and inwardly of the outer frame members 16. Each bearing sleeve 29 has a plate 60 fixedly secured thereto which, as shown in Figure 3, is adapted to engage the upper side of a keeper member 49 when the drawbar is in coupled position with respect to the trailer 14.

The bearing sleeves 59 with the plates 60 provide a fulcrum by means of which the drawbar structure 15 is adapted to be rocked relative to the trailer 14 for elevating or lowering the trailer and the drawbar structure. The keeper members 49 as shown in Figures 3 and 6 have fixedly secured thereto a pair of stop members 61 which are fixed to the upper sides of the keeper members 49 and are adapted to be engaged by the rear ends of the L-shaped members 16.

In order to provide a means whereby the clevises 46 may be yieldably urged to a coupling position a pair of chains 62 are secured to the shaft 23 adjacent the outer end portions thereof, and a spring 63 is interposed in each chain 62.

Each chain 62 engages over a grooved roller 64 rotatably mounted through an inverted U-shaped member 65 which is secured to the upper side of the plate 21. A shaft 66 is rotatably carried by a downwardly and rearwardly inclined plate 67 which is secured to an outer frame member 16 and an adjacent inner frame member 22. The shaft 66 has fixed thereto a lever or arm 68, and a crank lever 69 is also secured to the shaft 66 and is adapted to engage a latch hook 70 carried by one of the plates 67. The chain 62 is partly wound about the shaft 23 as shown in Figure 3, and when the crank 69 is in locked position as shown in Figure 3 the shaft 23 is yieldably urged to rotate in a clockwise direction.

When the clevises 46 are to be uncoupled from the keeper members or hooks 49 the crank 69 is raised upwardly to release the tension on the chains 62 in order that the clevises 46 may gravitatingly swing downwardly to substantially vertical position. It will be understood that when the crank 69 is raised upwardly to a released position the jack shaft 31 will then be lowered to disengage the locking pins 47 from the keepers 53.

In order to provide a means whereby the drawbar structure 15 will be held in alignment with the tractor vehicle 10 during the coupling of the drawbar with the trailer 14, I have provided an extensible shaft 71 which is slidable in a guide sleeve 72 carried by the frame 12 of the tractor 10. The shaft 71 has a collar 73 on its forward end and a second collar 74 at its rear or projecting end.

A fork 75 is secured to a shaft 76 rotatably carried by the frame members 16, and a crank or lever 77 is secured to one end of the shaft 76 and is disposed on the outer side of one of the outer frame members 16. In the normal position of the lever 77 which is shown in full lines the fork 75 will be disposed in an upper released position out of the way of the shaft 71.

In the locked position of fork 75 lever or crank 77 will be raised to a vertical position as shown in dotted lines in Figure 1 and in full lines in Figure 3. Initially the shaft 71 will be moved rearwardly to the position shown in Figures 2 and 3 whereupon lever 77 may be raised upwardly to a vertical position so that fork 75 will straddle shaft 71. The fork 75 will, in the locked position, hold the drawbar structure against turning movement relative to the tractor vehicle when the latter is backed to a coupling position with respect to the trailer 14.

A transparent tube 78 extends upwardly from the housing 37 and is provided with graduations 79. The jack shaft 73 is adapted to telescope upwardly into the tube 78 when the shaft 31 is moved upwardly so that the operator of the tractor vehicle 10 will be able to determine by a glance at the tube 78 the exact height of the forward end of the trailer 14 with respect to the ground or rod. The tube 78 is also provided with a cap 80 so that a lubricant may be discharged into the tube 78 for lubricating the jack shaft 31.

In the use and operation of this drawbar structure assuming that the trailer 14 is in the lowered position shown in Figure 3 with the drawbar disengaged from the trailer, the tractor 10 is backed toward the trailer 14, and at this time the drawbar 15 will be locked relative to the tractor 10 by means of the shaft 71 and the locking fork 75 which at this time will be in the full line position shown in Figures 2 and 3. The shaft 23 will be lowered to a position whereby the coupling pins 47 may ride downwardly on the inclined noses of the keeper members 49. The shaft 23 will be under tension by lowering of the crank 69 to the shaft tensioning position. The clevises 46 will snap into the keeper members 53 at the time the rear end of the drawbar 15 abuts against the stop members 61.

The drawbar 15 with the forward end of the trailer 14 may be elevated to an operating position by rotating the nut 33 to raise the jack shaft 31. Raising of the jack shaft 31 will elevate the cross shaft 23 so that the trailer frame 14 will be raised at its forward end with the bearing plates 60 engaging the upper sides of the keeper members or hooks 49. In the normal running or moving position of the trailer the trailer will be disposed in a substantially horizontal position as shown in Figure 1.

In the event it is desired to elevate the trailer frame at its forward end to a position above the horizontal, this can be accomplished by further raising the jackshaft 31 and the clevises 46. The drawbar structure 15 may be uncoupled from the trailer 14 and the latter disposed in either a loading or unloading position by lowering the jack shaft 13 and releasing the shaft 23 from the tension of the chain 62.

The structure hereinbefore described will provide a detachable drawbar structure which will facilitate the loading or unloading of the trailer and will also provide a means whereby the forward end of the underslung or low slung trailer may be raised to pass over ridges or humps which may be encountered in a road or other position.

What is claimed is:

1. In combination a tractor vehicle having a fifth wheel, a trailer, an inverted L-shaped drawbar having a forward end attached to said fifth wheel, reciprocably slidable movable means mounted on said drawbar for vertical movement with respect thereto, whereby said movable means may assume various heights above the ground, actuating means comprising a jack screw secured to said movable means, a nut threadably engaging said jack screw, and means for rotating said nut, said last-mentioned means comprising a power take-off means on said tractor vehicle and means drivingly connecting said nut with said power take-off means, said actuating means being adapted for raising or lowering said movable means, and coupling means for connecting the forward end of said trailer to said movable means, whereby the height of said trailer forward end may be varied.

2. In combination a tractor vehicle having a fifth wheel, a trailer, an inverted L-shaped drawbar having a forward end attached to said fifth wheel, reciprocably slidable movable means mounted on said drawbar for vertical movement with respect thereto, whereby said movable means may assume various heights above the ground, actuating means for raising or lowering said movable means, said actuating means comprising a power take-off means on said tractor vehicle and means drivingly connecting said power take-off means with said movable means for raising or lowering the latter, and coupling means for connecting the forward end of said trailer to said movable means, whereby the height of said trailer forward end may be varied.

3. In combination a tractor vehicle having a fifth wheel, a trailer, an inverted L-shaped drawbar having a forward end attached to said fifth wheel, reciprocably slidable movable means mounted on said drawbar for vertical movement with respect thereto, whereby said movable means may assume various heights above the ground, actuating means for raising or lowering said movable means, said actuating means comprising a shaft secured to said movable means, means drivingly engaging the shaft for raising and lowering the latter, and a fixed transparent housing closing said shaft and having indicia markings thereon, whereby the operator may observe the relative position of the shaft within the transparent housing and thereby determine the height above the ground of the forward end of the trailer, and coupling means for connecting the forward end of said trailer to said movable means, whereby the height of said trailer forward end may be varied.

4. In combination a tractor vehicle having a fifth wheel, a trailer, an inverted L-shaped drawbar having a forward end attached to said fifth wheel and also having a rear end including wheels engaging the ground to support said rear end, movable means mounted on said drawbar for vertical movement with respect thereto, whereby said movable means may assume various heights above the ground, actuating means for raising or lowering said movable means, said actuating means comprising a jack screw secured to said movable means, a rotatable nut threadably engaging said jack screw having gear means secured thereto, a gear engaging said gear means, a power take-off means on said vehicle and means drivingly connecting said gear with said power take-off means, and coupling means for connecting the forward end of said trailer to said movable means, whereby the height of said trailer forward end may be varied, said movable means being approximately vertically reciprocably slidable with respect to said drawbar.

5. A drawbar for coupling a tractor vehicle with a trailer comprising an inverted L-shaped frame, movable means mounted on said frame for vertical movement with respect thereto, whereby said movable means may assume various heights above the ground, actuating means for raising or lowering said movable means, and coupling means for connecting the forward end of said trailer to said movable means, whereby the height of said trailer forward end may be varied, said coupling comprising a downwardly extending member freely pivotally mounted at its upper end to said movable means, the lower end of said member having means adapted to interengage with the trailer forward end when said member is pivoted in one direction, spring means normally pivotally urging said member in said one direction, and means for releasing the spring means to allow said member to extend vertically, whereby said lower end of the member may be disengaged from the trailer forward end.

6. A gooseneck coupling for connecting a tractor and trailer together, said coupling comprising an inverted L-shaped member having a horizontal side and a vertical side, a fifth wheel element carried by said horizontal side for connection with a complementary fifth wheel element on the tractor, a vertically movable slide carried by said vertical side, detachable coupling means carried by said slide engageable with the trailer, a fulcrum means carried by said vertical side rearwardly of said slide and engageable with the upper side of the trailer, and means for vertically adjusting said slide and coupling means to thereby vary the angular relation of said vertical side with respect to the trailer.

DEAN A. PARKER.

References Cited in the file of this patent

UNITED STATES PATENTS

| Number | Name | Date |
|---|---|---|
| 1,739,364 | Lake | Dec. 10, 1929 |
| 2,327,308 | Johnston | Aug. 17, 1943 |
| 2,331,713 | Mosling | Oct. 12, 1943 |
| 2,389,211 | Pointer | Nov. 20, 1945 |
| 2,408,401 | King | Oct. 1, 1946 |
| 2,449,947 | Meadows | Sept. 21, 1948 |
| 2,481,223 | Johnson | Sept. 6, 1949 |
| 2,489,112 | Talbert | Nov. 22, 1949 |
| 2,531,694 | Larsen | Nov. 28, 1950 |
| 2,546,531 | Vutz | Mar. 27, 1951 |
| 2,590,181 | Keesler | Mar. 25, 1952 |
| 2,590,210 | Rogers | Mar. 25, 1952 |
| 2,613,945 | Talbert | Oct. 14, 1952 |

FOREIGN PATENTS

| Number | Country | Date |
|---|---|---|
| 534,195 | Great Britain | Feb. 28, 1941 |